United States Patent
Graßl

(10) Patent No.: US 10,862,306 B2
(45) Date of Patent: Dec. 8, 2020

(54) ENERGY SUPPLY DEVICE TO SUPPLY ELECTRICAL ENERGY FOR AT LEAST ONE TERMINAL DEVICE AND METHOD FOR OPERATING AN ENERGY SUPPLY DEVICE

(71) Applicant: AUDI AG, Ingolstadt (DE)

(72) Inventor: Tobias Graßl, Denkendorf (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/037,184

(22) Filed: Jul. 17, 2018

(65) Prior Publication Data
US 2019/0106001 A1    Apr. 11, 2019

(30) Foreign Application Priority Data
Oct. 5, 2017    (DE) .................. 10 2017 217 729

(51) Int. Cl.
| | |
|---|---|
| *H02J 7/00* | (2006.01) |
| *H02J 3/32* | (2006.01) |
| *B60L 53/53* | (2019.01) |
| *B60L 53/14* | (2019.01) |
| *H02J 7/02* | (2016.01) |

(Continued)

(52) U.S. Cl.
CPC ............... *H02J 3/32* (2013.01); *B60L 53/14* (2019.02); *B60L 53/22* (2019.02); *B60L 53/30* (2019.02); *B60L 53/31* (2019.02); *B60L 53/51* (2019.02); *B60L 53/53* (2019.02); *B60L 55/00* (2019.02); *H01M 10/44* (2013.01); *H02J 7/0027* (2013.01); *H02J 7/022* (2013.01); *H02J 7/342* (2020.01); *H02J 7/35* (2013.01);

(Continued)

(58) Field of Classification Search
USPC ........................................................ 320/109
See application file for complete search history.

(56) References Cited

U.S. PATENT DOCUMENTS

| | | |
|---|---|---|
| 2004/0130292 A1 | 7/2004 | Buchanan et al. |
| 2010/0096921 A1 | 4/2010 | Ishida et al. |

(Continued)

FOREIGN PATENT DOCUMENTS

| | | |
|---|---|---|
| DE | 102009001337 A1 | 9/2010 |
| DE | 102009028500 A1 | 2/2011 |

(Continued)

OTHER PUBLICATIONS

English Translation of DE 102011087015 (Year: 2013).*

(Continued)

*Primary Examiner* — Samuel Berhanu
(74) *Attorney, Agent, or Firm* — Maier & Maier, PLLC

(57) ABSTRACT

An energy supply device to supply electrical energy for at least one terminal device, with a power grid connector for connection of the energy supply device to an alternating current power grid and with a rectifier device for conversion of an alternating current supplied via the power grid connector to a direct current in an intermediate circuit. In this case, a plurality of voltage transformers and a plurality of direct current terminals are provided, wherein the voltage transformers are each electrically connected, on the one hand, at least intermittently, to the intermediate circuit and, on the other hand, at least intermittently, to a direct current terminal of the plurality of direct current terminals.

6 Claims, 2 Drawing Sheets

(51) Int. Cl.
  *B60L 53/31* (2019.01)
  *B60L 53/22* (2019.01)
  *B60L 53/30* (2019.01)
  *B60L 55/00* (2019.01)
  *B60L 53/51* (2019.01)
  *H02J 7/35* (2006.01)
  *H02J 7/34* (2006.01)
  *H01M 10/44* (2006.01)
  *H02M 1/00* (2006.01)

(52) U.S. Cl.
  CPC ....... *B60L 2210/10* (2013.01); *B60L 2210/30* (2013.01); *H02J 2207/40* (2020.01); *H02M 2001/009* (2013.01)

(56) References Cited

U.S. PATENT DOCUMENTS

| | | | | |
|---|---|---|---|---|
| 2011/0057724 | A1* | 3/2011 | Pabon | H02M 7/219 327/581 |
| 2014/0320083 | A1 | 10/2014 | Masuda et al. | |

FOREIGN PATENT DOCUMENTS

| | | |
|---|---|---|
| DE | 102010002237 A1 | 8/2011 |
| DE | 102011079430 A1 | 1/2013 |
| DE | 102011083741 A1 | 4/2013 |
| DE | 102011087015 A1 | 5/2013 |
| DE | 102012210284 A1 | 12/2013 |
| EP | 2 110 923 A1 | 10/2009 |
| EP | 2 450 221 A2 | 5/2012 |
| EP | 2 752 431 A1 | 3/2013 |
| EP | 2 725 676 A1 | 4/2014 |
| EP | 2 751 902 A1 | 7/2014 |
| EP | 2 784 899 A1 | 10/2014 |
| EP | 3 021 446 A1 | 5/2016 |
| JP | H06-178461 A | 6/1994 |
| JP | 2013-99233 A | 5/2013 |
| WO | 2011/145939 A2 | 11/2011 |
| WO | 2013/032519 A1 | 3/2013 |

OTHER PUBLICATIONS

Office Action dated Nov. 20, 2018 in corresponding German Application No. 10 2017 217 729.2; 13 pages including partial machine-generated English-language translation.

Examination Report dated May 18, 2018 of corresponding German Application No. 102017217729.2; 10 pgs.

European Search Report dated Feb. 13, 2019, in connection with corresponding EP Application No. 18181072.2 (13 pgs., including machine-generated English translation).

European Office Action dated Jul. 15, 2020, in connection with corresponding EP Application No. 18 181 072.2 (10 pp., including machine-generated English translation).

* cited by examiner

ENERGY SUPPLY DEVICE TO SUPPLY ELECTRICAL ENERGY FOR AT LEAST ONE TERMINAL DEVICE AND METHOD FOR OPERATING AN ENERGY SUPPLY DEVICE

FIELD

The invention relates to an energy supply device to supply electrical energy for at least one terminal device, with a power grid connector for the connection of the energy supply device to an alternating current power grid and with a rectifier device for conversion of an alternating current supplied via the power grid connector to a direct current in an intermediate circuit. The invention further relates to a method for operating an energy supply device.

BACKGROUND

The energy supply device serves to supply electrical energy for the at least one terminal device and preferably for a plurality of terminal devices. The terminal device or at least one of the terminal devices is preferably designed as a motor vehicle. By use of the energy supply device, energy can be supplied to the motor vehicle for charging an energy storage unit of the motor vehicle. The energy storage unit is present, in particular, in the form of a traction battery in which electrical energy is intermediately stored or can be intermediately stored for operation of a traction drive of the motor vehicle. The traction drive is designed to convert electrical energy, in particular electrical energy that has been intermediately stored in the energy storage unit or in the traction battery, to mechanical energy that is directed at driving the motor vehicle.

The energy supply device is equipped with the power grid connector, by way of which it can be connected to the alternating current power grid. The alternating current power grid is, for example, a public alternating current power grid. In addition, the energy supply device is equipped with the rectifier device, which is electrically connected, on the one hand, to the power grid connector and, on the other hand, to the intermediate circuit. The rectifier device serves for converting the alternating current that is taken from the alternating current power grid via the power grid connector to direct current, which is present in the intermediate circuit.

The publication DE 10 2012 2010 284 A1 relates to a method for operating a charging station of an electric vehicle in a household, which station comprises a rectifier, an interface for connection of the electric vehicle, a switching system, and an energy storage unit. For charging the energy storage unit, the rectifier is connected at the alternating current end to the power supply network of the household by means of the switching system. When the electric vehicle is charged via the interface, the rectifier is disconnected from the power supply network by means of the switching system.

SUMMARY

The object of the invention is to propose an energy supply device that has advantages in comparison to other energy supply devices, and, in particular, makes possible an extremely flexible operation and, especially preferred, makes possible a high degree of integration of a plurality of terminal devices.

In accordance with the invention, this is achieved with an energy supply device. A plurality of voltage transformers and a plurality of direct current terminals are provided in this case, wherein the voltage transformers are each electrically connected, on the one hand, at least intermittently, to the intermediate circuit and, on the other hand, at least intermittently, to a direct current terminal of the plurality of direct current terminals, wherein a plurality of the direct current terminals can be connected to the same one of the voltage transformers and/or a plurality of the voltage transformers can be connected to the same one of the direct current terminals, and/or at least a first one of the direct current terminals can be electrically connected via one of the voltage transformers to another, second one of the direct current terminals.

The voltage transformers are present in the form of direct current converters and therefore serve for converting a direct current, once again, to a direct current. For example, the direct current that is present at the input end of one of the voltage transformers has a first voltage and the direct current that is present at the output end of this voltage transformer has a second voltage, wherein the second voltage differs from the first voltage. The direct current terminals serve for connection of the at least one terminal device and preferably for connection of a plurality of terminal devices. In particular, a terminal device is connected to each of the direct current terminals. As terminal devices, it is possible to use basically any desired devices, regardless of whether they take up and/or supply electrical energy.

It has already been mentioned above that one of the terminal devices can be present in the form of a motor vehicle. Further examples of terminal devices are a photovoltaic system, a stationary energy storage unit for intermediate storage of electrical energy, and a technical household device, such as, for example, a heat pump. However, what the terminal devices have in common is the fact that they are operated with direct current or supply direct current for the energy supply device.

Each of the voltage transformers is, on the one hand, electrically connected, particularly at the input end, at least intermittently, to the intermediate circuit. On the other hand, that is, particularly at the output end, each of the voltage transformers can be electrically connected to at least one of the direct current terminals. Preferably, there are just as many voltage transformers as direct current terminals, so that each of the voltage transformers can be connected to at least exactly one of the direct current terminals or vice versa.

In a first embodiment of the energy supply device or, alternatively, in a first kind of operation of the energy supply device, it is then provided that a plurality of the direct current terminals are electrically connected to the same one of the voltage transformers. In a second embodiment or in a second kind of operation, it is provided that a plurality of the voltage transformers can be electrically connected or are electrically connected to the same one of the direct current terminals. In a third embodiment of the energy supply device or in a third kind of operation of the energy supply device, it is provided that at least the first one of the direct current terminals can be electrically connected or is electrically connected via one of the voltage transformers to the other, second one of the direct current terminals. The energy supply device can be designed only for carrying out one of the kinds of operation. Preferably, however, it enables at least two kinds of operation or even all three kinds of operation to be carried out.

In the scope of this description, only the kinds of operation are addressed. However, it is always obvious that the energy supply device can be provided and designed for carrying out only one of the kinds of operation or at least not all kinds of operation. For example, it is possible to create an energy supply device that is provided and designed for carrying out solely the first kind of operation, solely the second kind of operation, or solely the third kind of operation. Likewise, the energy supply device can be provided and designed for carrying out solely the first kind of operation and the second kind of operation, for carrying out solely the first kind of operation and the third kind of operation, or for carrying out solely the second kind of operation and the third kind of operation. Especially preferred is obviously an embodiment of the energy supply device that is provided and designed for carrying out all three kinds of operation.

It is noted that it can obviously be provided that some of the voltage transformers and some of the direct current terminals are operated in one of the kinds of operation and other ones of the voltage transformers and other ones of the direct current terminals are operated in another one of the kinds of operation. For this purpose, the voltage transformers and the direct current terminals are divided into a plurality of groups, wherein each of the groups is operated in one of the kinds of operation. It can be provided here that one group or a plurality of the groups is or are operated in the first kind of operation, one group or a plurality of the groups is or are operated in the second kind of operation, and/or one group or a plurality of the groups is or are operated in the third kind of operation.

In the first kind of operation, a plurality of direct current terminals are to be electrically connected to a single voltage transformer. This means that the terminal devices connected to the direct current terminals are all supplied with electrical energy via this voltage transformer or electrical energy is fed into the intermediate circuit via this voltage transformer. This procedure is appropriate, above all, in the case when the momentary actual power or the nominal power of the terminal devices is small and, in particular, is smaller in sum total than the nominal power of the voltage transformer. In addition, the terminal devices to which the direct current terminals are connected must have the same or at least nearly the same input voltage or output voltage.

In the second kind of operation, a procedure that is converse to the first kind of operation is essentially provided, namely, the electrical connection of a plurality of the voltage transformers to the same direct current terminal. This can be carried out when the individual voltage transformers have a nominal power that is too small and, in particular, a nominal power that is less than the actual power or the nominal power that is required at the direct current terminal for the device connected to the direct current terminal.

In the third kind of operation, it is provided that the first direct current terminal and the second direct current terminal are to be electrically decoupled from the power grid connector. Instead of this, the first direct current terminal is to be connected at the input end to the voltage transformer and the second direct current terminal is to be connected at the output end to the voltage transformer. This makes possible the transmission of electrical energy between the first direct current terminal and the second direct current terminal or vice versa with bypassing of the intermediate circuit.

Both in the first kind of operation and in the second kind of operation, it is advantageous to adjust the voltage of the direct current supplied by means of the rectifier device preferably to the input voltage of the terminal device that has the largest nominal power or actual power. Through this procedure, converter losses in the rectifier device are minimized.

This will be made clearer on the basis of an example. For example, the photovoltaic system, the motor vehicle, and a technical household device constitute terminal devices. The photovoltaic system feeds electrical energy having a first power into the intermediate circuit, whereas the motor vehicle is to be supplied with electrical energy having a second power and the technical household device is to be supplied with electrical energy having a third power. The three terminal devices are operated with different voltages. The sum total of the second power and third power is greater than the first power, so that electrical energy is to be supplied from the alternating current power grid via the power grid connector in order to compensate for the difference.

In order to reduce losses in the voltage transformers via which the terminal devices are linked to the intermediate circuit, it is then provided that the voltage that is present in the intermediate circuit is adjusted to the voltage of the terminal device with the highest power. In this example, said power is the second power. The electrical energy supplied by the photovoltaic system is adjusted by use of one voltage transformer or a plurality of the voltage transformers to the intermediate circuit voltage. In analogy to this, electrical energy is supplied to the technical household device for which the corresponding voltage transformer or voltage transformers is or are adjusted to the voltage required by the terminal device.

At least a part of the power required in the intermediate circuit can also be supplied from the stationary energy storage unit instead of via the power grid connector. In the scope of the example described here, however, the stationary energy storage unit is decoupled from the intermediate circuit, in particular by way of corresponding actuation of the energy supply device, particularly of the corresponding voltage transformer.

If, in contrast, no further electrical energy is to be supplied to the motor vehicle, because, for example, the energy storage unit of the motor vehicle is completely charged, then, for the case that the first power is greater than the third power, it is provided that the voltage present in the intermediate circuit is to be adjusted to the voltage of the photovoltaic system. In the scope of this example, it can be provided that, instead of the technical household device, the stationary energy storage unit is connected to the energy supply device and is to be charged with the third power.

For example, the power with which the energy storage unit can be charged is less than the power supplied by the photovoltaic system. In this case, it is possible, via the power grid connector, to feed electrical energy into the alternating current power grid. In particular, for this purpose, the rectifier device is preferably bidirectional in design and therefore makes it possible to feed electrical energy back into the alternating current power grid.

Another embodiment of the invention provides that the rectifier device has a bidirectional rectifier or else a bidirectional first rectifier and a unidirectional second rectifier that is connected in parallel to the first rectifier. Reference has already been made to the preferred use of the bidirectional rectifier. By use of the bidirectional rectifier, it is possible for the rectifier device both to take electrical energy from the alternating current power grid and to supply electrical energy to the intermediate circuit as well as to take electrical energy from the intermediate circuit and to supply electrical energy to the alternating current power grid.

It can be provided that the bidirectional rectifier is the sole rectifier of the rectifier device. For cost reduction, however, it is also possible for a plurality of rectifiers with smaller nominal power to be used, namely, the first rectifier and the second rectifier. In this case, the first rectifier is designed as a bidirectional rectifier, and in this respect, makes it possible to feed electrical energy back into the alternating current power grid. In contrast, the second rectifier is unidirectional in design and therefore solely enables alternating current taken from the alternating current power grid to be rectified to the direct current of the intermediate circuit. Obviously, it is alternatively possible for a plurality of bidirectional rectifiers and/or a plurality of unidirectional rectifiers to form the rectifier device.

Another preferred embodiment of the invention provides that the plurality of direct current terminals are arranged in or on a common housing of the energy supply device, in which the rectifier devices and the voltage transformers are present. The energy supply device is consequently highly integrated in design and represents a central unit at which numerous terminal devices are attached. In particular, the energy supply device is present as a central power supply unit for technical household devices.

Another preferred embodiment of the invention provides that at least one of the direct current terminals and, in particular, each of the direct current terminals can be electrically connected to the intermediate circuit with bypassing of the voltage transformers. An electrical connection of this kind is preferably realized when the terminal device can be properly operated with the voltage existing in the intermediate circuit. Through the direct connection of the direct current terminal to the intermediate circuit, losses that would otherwise occur in the voltage transformer or voltage transformers are prevented.

In the scope of another embodiment of the invention, it is provided that at least the voltage transformer that can be connected to the second direct current terminal via the first direct current terminal can be electrically decoupled from the intermediate circuit by means of a disconnecting switch. Reference to the decoupling of the voltage transformer from the intermediate circuit has already been made above. The disconnecting switch is provided for this purpose. Through the decoupling of the voltage transformer from the intermediate circuit, it is possible for both direct current terminals or the terminal devices connected to them to be operated with voltages that differ from the voltage of the intermediate circuit. This makes possible an especially flexible operation of the energy supply device.

An enhancement of the invention provides that a switch arrangement is electrically connected to the first direct current terminal and to the second direct current terminal, by means of which, in a first switch position, either the first direct current terminal or the second direct current terminal is connected to an output end of the one voltage transformer. The switch arrangement thus makes possible the flexible use of the voltage transformer in that either the first direct current terminal or the second direct current terminal is connected to the output end of the voltage transformer. When the first switch position of the switch arrangement is present, preferably the input end of the voltage transformer is electrically connected to the intermediate circuit, so that, by way of the voltage transformer, either electrical energy can be supplied to the terminal device from the intermediate circuit or else electrical energy supplied by the terminal device can be fed back into the intermediate circuit.

Another preferred enhancement of the invention provides that, in a second switch position, the first direct current terminal and the second direct current terminal are electrically connected in parallel to the output end of the one voltage transformer. This is advantageous, above all, when the two direct current terminals or the terminal devices connected to them are operated with the same voltage and the nominal power of the voltage transformer suffices in order to supply both terminal devices. On account of the parallel connection of the direct current terminals, a high utilization of the voltage transformer and consequently a good efficiency thereof are achieved.

Another embodiment of the invention provides that, in a third switch position of the switch arrangement, the first direct current terminal is electrically connected to an input end of the one voltage transformer and the second direct current terminal is electrically connected to the output end of the one voltage transformer. In the third switch position, it is possible, for example, for the above-described third kind of operation of the energy supply device to be implemented. Preferably, when the third switch position of the switch arrangement is present, the voltage transformer is electrically disconnected from the intermediate circuit. The third switch position makes it possible to operate the terminal devices connected to the direct current terminals independently of the intermediate circuit, so that a high efficiency can be achieved.

Finally, in the scope of another preferred embodiment of the invention, it can be provided that, in a fourth switch position of the switch arrangement, the first direct current terminal and the second direct current terminal are each electrically connected to the input end of the one voltage transformer. In other words, in the fourth switch position, the two direct current terminals or the respective terminal devices are connected directly to the intermediate circuit. This makes it possible to supply the terminal devices with electrical energy or, conversely, to supply electrical energy of the terminal devices to the intermediate circuit without losses that would otherwise occur in the voltage transformer. Obviously, when the fourth switch position is present, preferably the input end of the voltage transformer is connected to the intermediate circuit.

Although, in the scope of this description, four different switch positions have been addressed, it is not necessary that all of these switch positions are feasible by means of the switch arrangement, even though, of course, this is especially advantageous. Thus, it is possible by means of the switch arrangement to implement any desired combination of the switch positions in analogy to the procedure in regard to the kinds of operation of the energy supply device, to which reference has been made.

The invention also obviously relates to a power supply grid with a plurality of terminal devices to which the energy supply device is connected via its direct current terminals. Therefore, on the one hand, the energy supply device is connected to the alternating current power grid via the power grid connector and, on the other hand, the energy supply device is connected to the terminal devices of the power supply grid, namely, via the direct current terminals. Both the energy supply device and the terminal devices can be designed and/or further developed in accordance with the statements made in the scope of this description.

The invention further relates to a method for operating an energy supply device to supply electrical energy for at least one terminal device and, in particular, for operating an energy supply device in accordance with the statements made in the scope of this description, wherein the energy supply device is equipped with a power grid connector for connection of the energy supply device to an alternating current power grid and with a rectifier device for conversion of an alternating current supplied via the power grid connector to a direct current in an intermediate circuit. A plurality of voltage transformers and a plurality of direct current terminals are present here, wherein each of the voltage transformers is electrically connected, on the one hand, at least intermittently, to the intermediate circuit and, on the other hand, at least intermittently, to one direct current terminal of the plurality of direct current terminals, wherein a plurality of the direct current terminals can be connected to the same one of the voltage transformers and/or a plurality of the voltage transformers can be connected to the same one of the direct current terminals and/or at least a first one of the direct current terminals can be electrically connected via one of the voltage transformers to another, second one of the direct current terminals.

Reference to the advantages of such a procedure or of such an embodiment of the energy supply device has already been made. Both the energy supply device and the method for the operation thereof can be further developed in accordance with the statements made in the scope of this description, so that reference is made to said statements.

BRIEF DESCRIPTION OF THE DRAWINGS

The invention will be explained in detail below on the basis of the exemplary embodiments illustrated in the drawing, without any limitation of the invention thereby occurring. Shown are.

DETAILED DESCRIPTION

Figure 1:
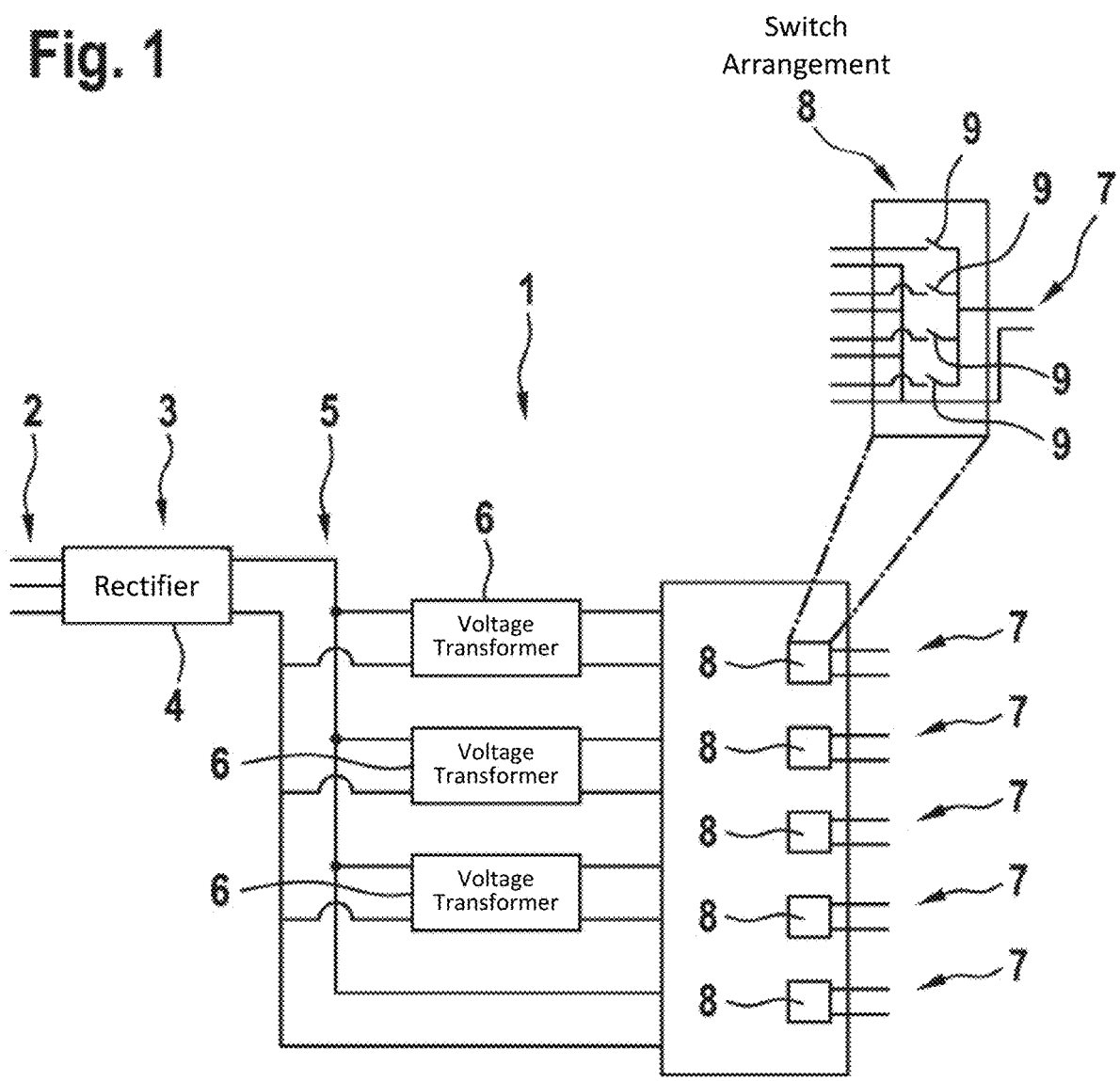
FIG. 1 a schematic illustration of an energy supply device to supply electrical energy for at least one terminal device, FIG. 2 a detailed illustration of a part of the energy supply device in a first embodiment, and FIG. 3 a detailed illustration of a part of the energy supply device in a second embodiment.

FIG. 1 shows a schematic illustration of an energy supply device 1, which serves to supply electrical energy for at least one terminal device (not illustrated here). The energy supply device 1 has a power grid connector 2, by way of which the energy supply device 1 is connected to an alternating current power grid, preferably a public alternating current power grid. Connected to the power grid connector 2 is a rectifier device 3, which in the exemplary embodiment illustrated here, has a bidirectional rectifier 4. In addition to the rectifier 4, another rectifier, preferably a bidirectional rectifier, may be present, which is electrically connected in parallel to the rectifier 4.

The rectifier arrangement 3 and consequently the rectifier 4 serve for conversion of an alternating current that is supplied from the alternating current power grid via the power grid connector 2 to a direct current, which is present in an intermediate circuit 5. At the intermediate circuit 5, it is possible for a plurality of direct current terminals 7 to be electrically connected to the intermediate circuit 5 by way of a plurality of voltage transformers 6 (in the exemplary embodiment illustrated here, three voltage transformers 6). Preferably, a switch arrangement is associated with each of the direct current terminals 7, wherein, by use of the switch arrangements 8, different kinds of operation of the energy supply device 1 can be realized.

One of the switch arrangements 8 is additionally illustrated in enlarged view. The other switch arrangements 8 are preferably set up analogously. The switch arrangement 8, shown enlarged, is equipped with a plurality of switches 9, which can be designed as mechanical switches or as semiconductor switches. By means of the switches 9, the corresponding direct current terminal 7 can be electrically connected optionally to one voltage transformer or to a plurality of the voltage transformers 6 and/or directly to the intermediate circuit 5.

Figure 2:
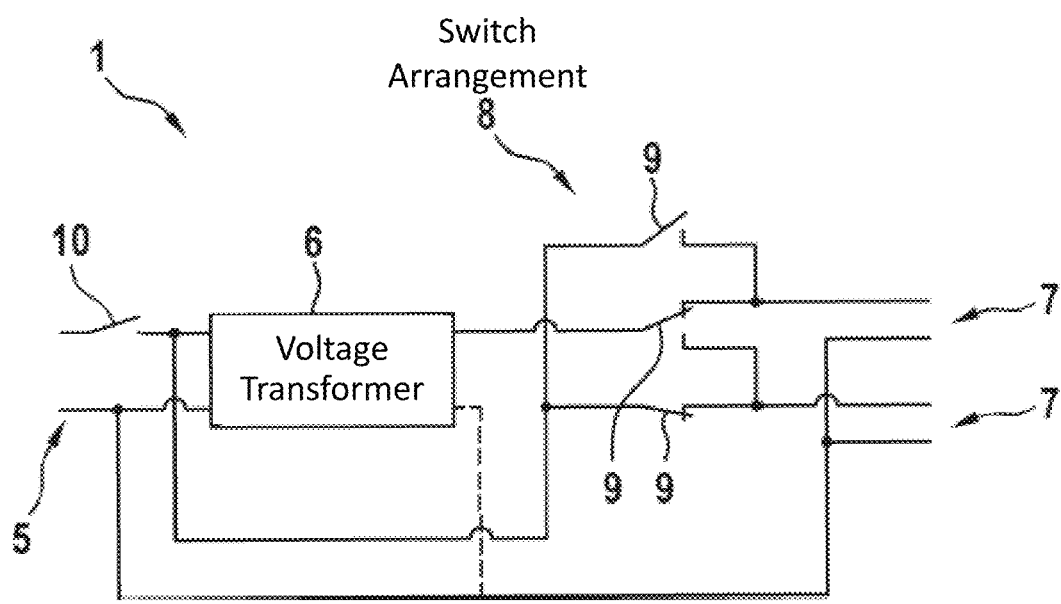

FIG. 2 shows a detailed illustration of a part of the energy supply device 1, wherein one of the voltage transformers 6, the switch arrangement 8, and two of the direct current terminals 7 are specifically illustrated. In the exemplary embodiment illustrated, the switch arrangement 8 is equipped with three switches 9 and is associated with two direct current terminals 7. The switch arrangement 8 makes possible different switch positions. In a first switch position, which is not illustrated here, the two direct current terminals 7 are connected in parallel to each other to the voltage transformer 6. In this case, another switch 10 of the switch arrangement 8 is preferably closed, so that the voltage transformer 6 is electrically connected at the input end to the intermediate circuit 5.

In a second switch position, the switches 9 are connected in such a way that only one of the direct current terminals 7 is electrically connected to an output end of the voltage transformer 6. In a third switch position, the switches 9 are designed in such a way that, in contrast, one of the direct current terminals 7 is electrically connected to the output end of the voltage transformer 6 and the respective other one of the direct current terminals 7 is electrically connected to an input end of the voltage transformer 6. In this switch position, preferably the switch 10 is opened, so that the voltage transformer 6 is electrically separated from the intermediate circuit 5.

Figure 3:
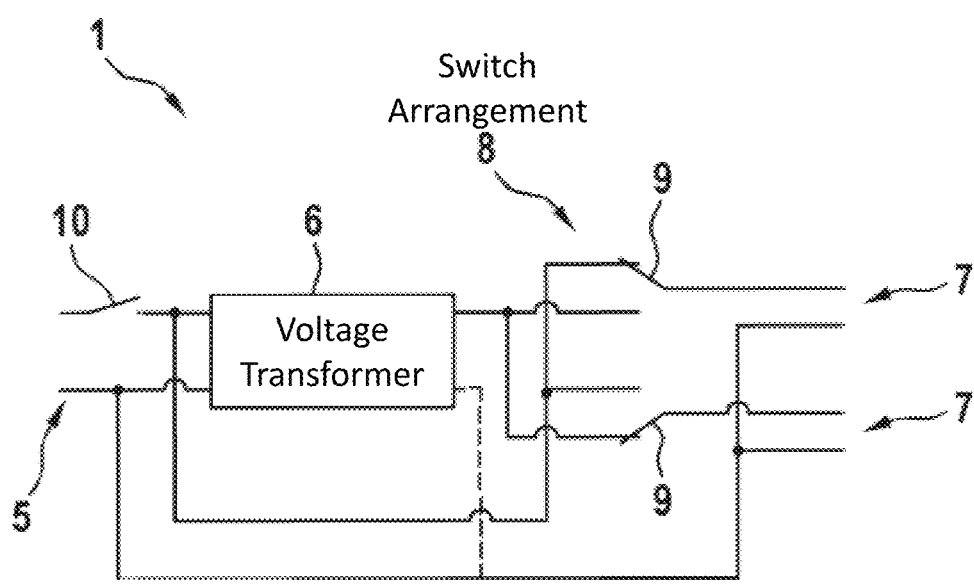

FIG. 3 shows a detail illustration of a part of the energy supply device 1 in a second embodiment. Said embodiment is designed similarly to the first embodiment, so that reference is made to the corresponding statements and only differences will be addressed below. Said differences lie in the design of the switch arrangement 8, which has only two switches 9. Said switches make possible different switch positions.

In the first switch position illustrated here, one of the direct current terminals 7 is electrically connected directly to the input end of the voltage transformer 6, in particular to the intermediate circuit 5, whereas the other one of the direct current terminals 7 is connected to the output end of the voltage transformer 6. In a second switch position, the switches 9 are arranged in such a way that, in turn, the two direct current terminals 7 are connected in parallel to each other to the output end of the voltage transformer 6. In a third switch position, the switches 9 are connected in such a way that both direct current terminals 7 are connected directly to the input end of the voltage transformer 6, in particular to the intermediate circuit 5.

The described energy supply device 1 has the advantage that it can be utilized extremely flexibly, because, by use of the switch arrangements 8, the direct current terminals 7 can be connected to one another in a diversity of ways via the voltage transformers 6 or directly to the intermediate circuit 5 or to one another. Accordingly, the energy supply device 1 has a high degree of integration and can find use, for example, as a central unit for technical household devices.

The invention claimed is:

1. An energy supply device to supply electrical energy for at least one terminal device, comprising:
   a power grid connector for connection of the energy supply device to an alternating current power grid and with a rectifier device for conversion of an alternating current supplied via the power grid connector to a direct current in an intermediate circuit and a plurality of voltage transformers and a plurality of direct current terminals, a switch arrangement electrically connected to at least one of the plurality of direct current terminals, the voltage transformers, and the intermediate circuit;

wherein, in a first switch configuration of the switch arrangement, the voltage transformers are each electrically connected, on the one hand, at least intermittently, to the intermediate circuit via a decoupling switch and, on the other hand, at least intermittently, to a direct current terminal of the plurality of direct current terminals, wherein, in a second switch configuration of the switch arrangement, one or more of the plurality of the direct current terminals are connected to one of the voltage transformers and/or a plurality of the voltage transformers are connected to one of the direct current terminals, such that the voltage transformers and direct current terminals are electrically connected in a parallel configuration, wherein, in a third switch configuration of the switch arrangement, a first one of the direct current terminals is directly electrically connected to an input end of one of the voltage transformers and a second direct current terminal is electrically connected to the output end of the one voltage transformer, wherein each decoupling switch is switchable to individually and electrically decouple the connected voltage transformer from the intermediate circuit.

2. The energy supply device according to claim 1, wherein the rectifier device has a bidirectional rectifier or a bidirectional first rectifier and a unidirectional second rectifier that is electrically connected in parallel to the first rectifier.

3. The energy supply device according to claim 1, wherein the plurality of direct current terminals are arranged in or on a common housing of the energy supply device, in which the rectifier device and the voltage transformer are present.

4. The energy supply device according to claim 1, wherein at least one of the direct current terminals and, in particular, each of the direct current terminals are electrically connected to the intermediate circuit with bypassing of the voltage transformers.

5. The energy supply device according to claim 1, wherein, in a fourth switch configuration of the switch arrangement, the first direct current terminal and the second direct current terminal are each electrically connected to the input end of the one voltage transformer.

6. A method for operating an energy supply device to supply electrical energy for at least one terminal device, in particular for operating an energy supply device comprising: equipping the energy supply device with a power grid connector for connection of the energy supply device to an alternating current power grid and with a rectifier device for conversion of an alternating current supplied via the power grid connector to a direct current in an intermediate circuit, including a plurality of voltage transformers and a plurality of direct current terminals, a switch arrangement electrically connected to at least one of the plurality of direct current terminals, the voltage transformers, and the intermediate circuit;

wherein, in a first switch configuration of the switch arrangement, the voltage transformers are each electrically connected, on the one hand, at least intermittently, to the intermediate circuit via a decoupling switch and, on the other hand, at least intermittently, to one direct current terminal of the plurality of direct current terminals, wherein, in a second switch configuration of the switch arrangement, one or more of the plurality of the direct current terminals are connected to one of the voltage transformers and/or a plurality of the voltage transformers are connected to one of the direct current terminals such that the voltage transformers and direct current terminals are electrically connected in a parallel configuration, wherein, in a third switch configuration of the switch arrangement, a first one of the direct current terminals is directly electrically connected to an input end of one of the voltage transformers and a second direct current terminal is electrically connected to the output end of the one voltage transformer, wherein each decoupling switch is switchable to individually and electrically decouple the connected voltage transformer from the intermediate circuit.

* * * * *